Sept. 19, 1967    P. VOSSIECK    3,342,476
STRESSING ELEMENT FOR PISTON RINGS
Filed May 21, 1965

Inventor
Paul VOSSIECK

By [signature]

United States Patent Office 3,342,476
Patented Sept. 19, 1967

3,342,476
STRESSING ELEMENT FOR PISTON RINGS
Paul Vossieck, Burscheid, Cologne, Germany, assignor to Goetzewerke Friedrich Goetze Aktiengesellschaft, Dusseldorf, Germany
Filed May 21, 1965, Ser. No. 457,691
Claims priority, application Germany, June 26, 1964, G 40,936
4 Claims. (Cl. 267—1.5)

ABSTRACT OF THE DISCLOSURE

Spring ring for urging oil stripping rings radially outwardly of a piston groove and for supporting the rings in the axial ends of the groove, and which comprises an undulating annular band having notches in the top and bottom of the radial portions thereof, with the inner ends of the notches bent backwardly to form curved lug regions that incline inwardly toward the adjacent end of the spring member.

This invention relates to stressing elements or springs which are used with piston rings of the oil regulating type.

One of the prior art types of piston rings which are used as oil stripping or oil regulating rings in internal combustion engines consists of thin piston rings which are supported in axial and radial directions by a spring member. The spring member has undulations or reverse bends therein which cause the member to exert forces in the radial and tangential directions to support the piston rings. The spring member is, of course, resilient in both tangential and radial directions.

An advantage of using such thin piston rings which are supported by the spring member is that the rings which are thin in the axial direction of the piston to which they are attached readily adapt themselves to irregularities in the cylinder walls.

One of the disadvantages of the above arrangement is that the spring member of the prior art constructions did not adequately support the inner peripheries of the piston rings and also the spring member had a tendency to become seated in the rings themselves.

Accordingly, an object of this invention is to provide an improved stressing element or spring member whose undulations extend radially and which spring member supports in an improved manner the piston rings with which it is used.

Another object of this invention is to provide an economical tangentially and radially resilient spring member which is provided with lugs for better supporting of the piston rings with which the spring member is used.

These and other objects and advantages will become more clearly understood in connection with the following description and drawings, in which.

Figure 1:
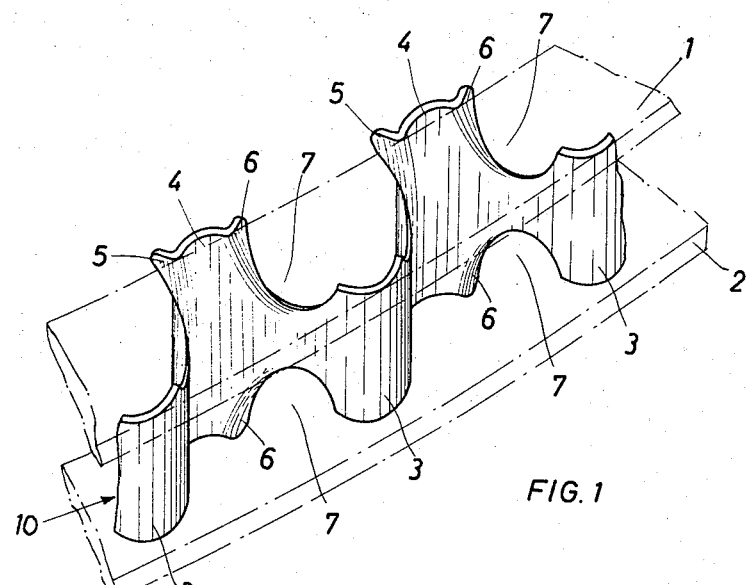
FIGURE 1 is a perspective view of stressing element or spring of this invention.

Referring to the drawings in more detail, FIGURE 1 shows a perspective view of a portion of the stressing element or spring 10 shown in solid lines, while the piston rings 1 and 2 with which the spring is used, are shown in phantom outline.

The spring 10 has a general circular shape and is formed of a plurality of reverse bends or undulations which are radially aligned as shown.

Figure 2:
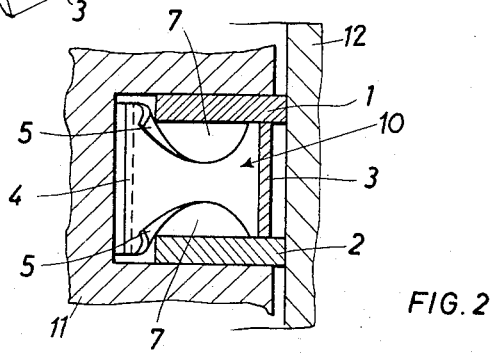
FIGURE 2 is a cross sectional view of the sealing system taken along a radial line.
Figure 3:
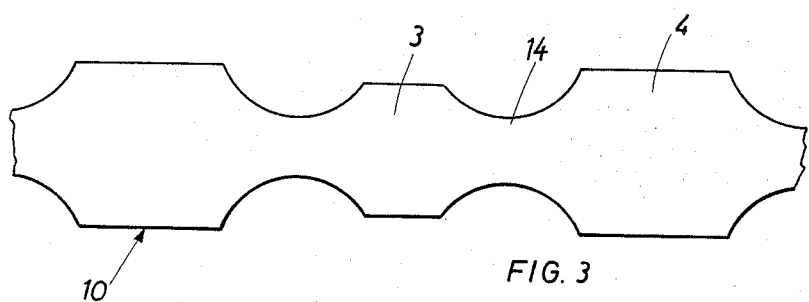
FIGURE 3 is a plan view of a portion of the spring which is developed into a plane.

The outer undulations or bends 3 are narrower in the direction of the axis of the piston 11 with which the spring is used than are the inner bends 4 as shown especially in FIGURE 2. The outer bend 3 is positioned between the piston rings 1 and 2 as shown, and an arcuately shaped portion 14 joins the bends 3 and 4 as shown in FIGURE 3. This joining portion is narrow and provides the oil escape passageways 7 as shown in FIGURE 2. The oil passageways may be provided by holes in the middle portions joining the inner and outer bends, however, it is preferable to cut away portions of the joining members as at 14 to provide the lugs 5 and 6 as shown in FIGURES 1 and 2. By this construction, the oil escape passageways merge with the lugs 5 and 6.

The lugs 5 and 6 extend radially outwardly from the inner portions of the undulations or bends. The lugs project from the sides of the springs by a distance almost equal to the thickness of the piston rings. By this construction, the springs are definitely prevented from digging into the backs of the rings. By inclining the rings as shown, it is possible to cause the springs to act upon the rings 1 and 2 in an axial direction to press the rings outwardly against the opposed surfaces of the piston groove. The spring also urges the rings into contact with the cylinder wall, and the lugs shown provide support at a plurality of places along the inner peripheries of the rings.

The development of the spring shown in FIGURE 3 shows that only little material need be cut away from the edges because the section forming bend 4 extends outwardly only slightly farther than the section forming bend 3.

It will be understood that this invention is susceptible to modification in order to adapt it to different usages and conditions; and accordingly, it is desired to comprehend such modifications within this invention as may fall within the scope of the appended claims.

What is claimed is:

1. In a band-like tangentially and radially resilient spring member of the type used for supporting a pair of washer-like oil stripping rings in respectively opposite axial ends of a groove provided therefor in a piston, said spring member having radially inner and radially outer reverse bends therein and web portions extending between said bends so as to form an annular undulating member, notches in the tops and bottoms of said web portions, the axial length of the spring member at the radially outer reverse bends being substantially equal to the axial spacing between the adjacent faces of said rings, the axial length of the spring member in the region of the radially inner reverse bends being greater than the axial spacing between the inner faces of said rings, and ring engaging lug means on said spring member engaging the inside inner edges of said rings, said lug means comprising bent back regions of said web portions at the radially inner ends of said notches in said web portions.

2. A spring member according to claim 1, in which each said lug means presents a surface to the respective ring which is rounded and convex toward the respective ring.

3. A spring member according to claim 2, in which each said notch is curved and the lug means on each side of the spring member converges with the axis of the spring member on the side of the spring member on which the respective lug means is located.

4. A spring member according to claim 3, in which the portions of the spring means which are bent to provide the said lug means are confined to the web portions of the spring member so as not to interfere with the flexibility of the spring means at the radially inner reverse bends thereof.

(References on following page)

References Cited

UNITED STATES PATENTS

| | | | |
|---|---|---|---|
| 2,910,334 | 10/1959 | Hamm | 267—1.5 |
| 2,917,353 | 12/1959 | Baumler et al. | 267—1.5 |
| 3,140,096 | 7/1964 | Rodenkirchen | 277—141 |
| 3,261,612 | 7/1966 | Games | 267—1.5 |

FOREIGN PATENTS 511,623  4/1955  Canada.

ARTHUR L. LA POINT, *Primary Examiner.*
EUGENE G. BOTZ, *Examiner.*
R. M. WOHLFARTH, *Assistant Examiner.*